Figure 1:
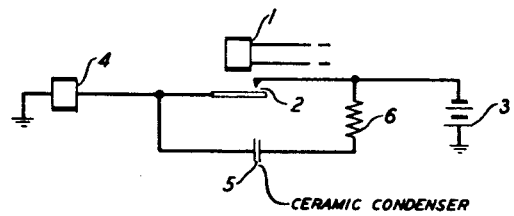

Oct. 23, 1951      A. M. CURTIS      2,572,598

CONTACT PROTECTION

Filed Dec. 6, 1947

INVENTOR
A. M. CURTIS DECEASED
LAVALETTE STEVENSON CURTIS
HIS EXECUTRIX
BY John E. Cassidy
ATTORNEY Patented Oct. 23, 1951

2,572,598

UNITED STATES PATENT OFFICE 2,572,598

CONTACT PROTECTION

Austen M. Curtis, deceased, late of South Orange, N. J., by Lavalette Stevenson Curtis, executrix, Morristown, N. J., assignor to Bell Telephone Laboratories, Incorporated, New York, N. Y., a corporation of New York Application December 6, 1947, Serial No. 790,149

5 Claims. (Cl. 175—294)

1

This invention relates to arrangements for protecting contacts which establish and interrupt the transfer of electrical energy in an electrical circuit and more particularly to a contact protector which utilizes a voltage dependent capacitance.

An object of the invention is the improvement of contact protectors.

A more specific object of the invention is the utilization in a contact protector of a voltage dependent capacitor to provide an improved contact protector.

The contact protector of the present invention utilizes a non-linear capacitance, that is to say, a capacitance the accumulated charge of which varies non-linearly with the applied voltage; more particularly a capacitance in which the ratio of accumulated charge to the applied voltage increases as the voltage is increased.

As is generally understood the deterioration of contacts in an electrical circuit is caused by a sudden rush of electrical energy through the contacts as the contacts are opened or closed. When contacts are unprotected a considerable amount of energy passing through the contacts, as the circuit is opened, takes the form of a number of relatively high voltage disruptive sparkovers which tend to pit and melt the contacts. In one class of contact protectors, protection is achieved by the connection to the contacts, generally in shunt therewith, of an energy accumulator, such as a capacitance, into which the excess energy is directed momentarily. Once transferred the energy is dissipated at a relatively slower rate in elements such as a resistance connected to the energy accumulator. In such contact protectors, in order to be effective the energy accumulator must be able to quickly absorb a relatively large amount of energy. In the case of circuits employing capacitances as the absorbing element, since the voltage peaks attained on opening a circuit, especially in cases wherein the main circuit includes any appreciable amount of lumped inductance, are frequently as much as five to ten or more times the voltage of the energy supply source connected to the circuit, it is necessary to employ relatively large amounts of capacitance. This is quite expensive.

In a contact protector operating on the above-described principle, a non-linear capacitance having the property of accumulating a charge in increasing ratio to the applied voltage, as the voltage is increased, constitutes an especially valuable element. The capacitance employed in the protector of the present invention has this property.

2

The present invention makes use of any of a number of ceramic condensers notably a condenser having a dielectric of barium titanate and the like having a high and variable dielectric constant, which condensers have been found to possess optimum properties adapting them to the objectives of the invention.

Ceramics in general may be defined as inorganic oxids or their mixtures fired to a high temperature, such as 400° C. or more, whereby a hard durable substance (ceramic) is formed which may be crystalline or amorphous in nature. Examples thereof are glass, porcelain, steatite and the titanates. Rutile, a naturally occurring form of titanium dioxide, and also the chemically formed titanium dioxide, are well known in the art and are characterized by a low loss and a dielectric constant $\epsilon$ of approximately 100.

In the highest known range of dielectric constant, namely, $\epsilon=1000$ to 10,000, the only known substances are apparently Rochelle salts of the ordinary and heavy hydrogen types and a ceramic, namely barium titanate or its mixture with strontium titanate. Titanates of the metals of the second periodic group may be divided into three main classes according to the magnitude of the dielectric constants. The first class characterized by $\epsilon<100$ embraces the titanates of magnesium ($\epsilon=17$), zinc ($\epsilon=30$), cadmium ($\epsilon=62$) and beryllium ($\epsilon=70$). The second class having $100<\epsilon<1000$ includes the titanates of cadmium ($\epsilon=115$) and strontium ($\epsilon=155$). The third class $\epsilon>1000$ includes barium titanate and its mixture with strontium titanate. The values of the dielectric constants appearing in parentheses are for room temperatures and a frequency of about a megacycle.

The dielectric constant for each of the classes in general increases with increasing electronic polarizability of the metallic ion. For titanates such as barium, calcium and strontium, which form crystal lattices of the perovskite type, the dielectric constant increases with the distance between the centers of the oxygen and titanium ions, and reaches especially high values in barium titanate.

In accordance with the invention it has been found that the direct current capacity of ceramic condensers, and in particular barium titanate condensers is dependent on the applied voltage, increasing with voltage non-linearly and by large percentages and that such condensers offer advantages as contact protectors in that such a condenser of small capacity at low voltage will perform the function of a larger condenser of the ordinary type since, in effect, it becomes a larger condenser at the higer spark-over voltages.

The invention may be understood from the following description when read with reference to the associated drawing showing four different circuit arrangemetns in which ceramic condensers are utilized as contact protectors. It is to be understood, however, that the invention is not limited to the specific arrangements in which the protector is exemplified in the four figures, for ceramic condensers may be utilized to advantage in protecting any devices subject to deterioration as a result of excessive discharge of electrical energy especially in cases where the voltages attending the discharge tend to increase greatly above normal momentarily. For this purpose the ceramic condenser may be arranged in any of a large number of well-known manners. Such condensers may be employed wherever the property which they exhibit, namely, substantially increased ratio of charge to voltage applied with increasing voltage, is of advantage and in its broader aspects the four figures considered together may be understood to exemplify one of many possible applications of a non-linear electric energy accumulator, as well as such an accumulator in combination with an energy dissipator.

In the drawing, Figs. 1 to 4 show contact protectors including ceramic condensers arranged in four different manners.

Refer now to Fig. 1 which shows a magnetic relay core and winding 1 which controls a pair of contacts 2. As is obvious, when the contacts 2 are opened and closed the circuit, including the relay winding and core 4 is unenergized and energized respectively. If the contacts are unprotected, as the contacts 2 opened and closed, destructive high voltage spark-overs tends to occur at contacts 2. To avoid this contacts 2 are shunted by the ceramic condensers in series with resistance 6. The shunting of contacts such as 2 with a contact protector, such as an ordinary condenser and a resistance in series therewith, is well known in the art. On making and breaking of contacts 2, the condenser accumulates a considerable portion of the excess energy which would otherwise be dissipated between the contacts and thereafter the energy is dissipated more slowly in resistance 6. This is well understood in the art. It is also well known that in order to be effective the condenser must be large enough, that is, have sufficient capacitance, to absorb the excess energy quickly. The larger the condenser of course the more expensive.

In the present invention a ceramic condenser is substituted for the ordinary condenser. The capacitance or ratio of charge to voltage of the ceramic condenser increases non-linearly with increasing voltage. This permits the utilization of smaller condensers.

The efficacy of ceramic condensers, such as ceramic titanium dioxide condensers, having smaller low voltage capacity than ordinary condensers has been tested and proven by applicant in a series of tests the results of which are presented below for various arrangements of condenser 5 and resistance 6 as indicated in the various figures.

Figure 2:
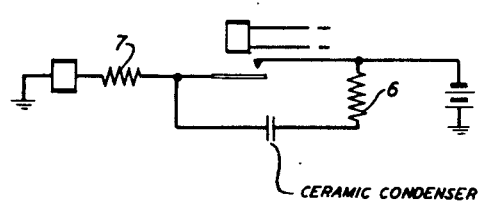
Figure 3:
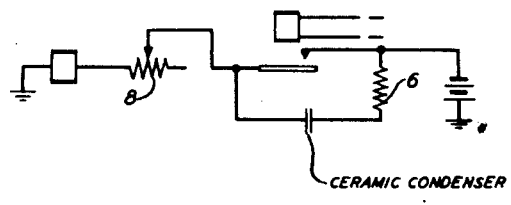
Figure 4:
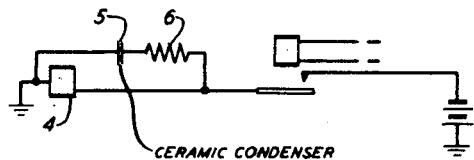

In Fig. 2 resistance 7 is connected in addition in series with the winding. Fig. 3 differs from Fig. 2 in that resistance 7 is replaced by a variable resistance 8 to fix the magnitude of the current in the circuit at different values for tests to be described hereinafter. In Fig. 4 condensers 5 and resistance 6 are connected in shunt with the winding of relay 4 and resistance 7 or 8 is omitted.

Preliminary to utilizing the ceramic condensers as contact protectors a lot of ten were measured individually. The capacitance of each individual unit as measured at 60 cycles on an ohmmeter was .011 microfarad. They were then measured on a Grasset Fluxmeter by the charge and discharge method. At 45 volts the effective capacitance of the ten condensers in parallel was found to be .12 microfarad.

Then the ten ceramic condensers connected in parallel were connected in circuit as shown in Fig. 1, the ten being represented in the figure by the single condenser 5. A 700-ohm Western Electric Company U-type relay was used as relay 4. A 500-ohm resistance was utilized as resistance 6. The voltage of battery 3 was 50 volts. The maximum voltage of the discharge on opening of the contacts was 250 volts. The ten ceramic condensers were removed and replaced by a number of mica condenser units, each unit of .01 microfarad capacitance, and arranged so that it was possible to vary the number of mica condenser units. It was found that it was necessary to insert twenty-two such units in parallel before the discharge voltage peak on opening of the contacts 2 was reduced to 250 volts afforded by the ten ceramic units.

Next the ceramic condensers and mica condensers were measured on direct current capacitance measuremetns comparing flux meter deflections. It was found that the capacitance of the ceramic condensers definitely increased with increase in battery voltage. At 150 volts the capacitance of the ten units in parallel was found to be .19 microfarad.

In another series of tests the circuit per Fig. 1 was arranged so that either 5, 11 or 21 ceramic condenser units, each rated at .01 microfarad capacitance at low voltage, were connected in parallel at different times to serve as condenser 5 in the figure. The peak voltage of the discharge across contacts 2 on opening the contacts was measured. Then the ceramic condensers were replaced by a variable number of mica condenser units, each of .01 microfarad capacitance, and the amount of mica condenser capacitance required to provide a discharge voltage peak of the same magnitude as that of the ceramic condensers was determined.

The results were as follows:

WITH FULL OPERATING CURRENT THROUGH THE WINDING OF RELAY 4 AND THE CIRCUIT ARRANGED AS IN FIG. 1 WITH A 500-OHM RESISTANCE AS RESISTANCE 6

| Number of ceramic normally .011 microfarad units of capacitance in condenser 5 | Peak voltage of discharge | Total capacity in microfarads of mica condenser utilized as condenser 5 to give same peak voltage as ceramic in column 1 | Equivalent capacitance of each ceramic unit in microfarads |
|---|---|---|---|
| 5 | 315 | .09 | .018 |
| 11 | 250 | .19 | .0173 |
| 21 | 190 | .33 | .0157 |

WITH 500-OHM RESISTANCE 7 IN SERIES WITH LOAD RELAY WINDING AS PER FIG. 2

| 5 | 275 | .08 | .0176 |
| 11 | 220 | .16 | .0145 |
| 21 | 170 | .30 | .0142 |

WITH CURRENT, I, IN MILLIAMPERES, CONTROLLED WITH VARIABLE RESISTANCE 8 AS PER FIG. 3

| | I | | | |
|---|---|---|---|---|
| 21 | 63 | 190 | .33 | .0157 |
| 21 | 40 | 170 | .30 | .0143 |
| 21 | 20 | 130 | .28 | .0133 |
| 21 | 10 | 80 | .24 | .0144 |

WITH CERAMIC CONDENSER AND RESISTANCE 6 SHUNTED AROUND WINDING AND NO SERIES RESISTANCE, AS PER FIG. 4

| | I | | | |
|---|---|---|---|---|
| 21 | 64 | 155 | .29 | .0138 |
| 11 | 64 | 205 | .16 | .0145 |
| 5 | 64 | 280 | .083 | .0166 |

Reference to the above tabulation indicates that in each instance, notwithstanding the disposition of the ceramic capacitance, the effective capacitance of each unit is greater than its normal rated capacitance at low voltage and that its capacitance is higher the higher the voltage.

What is claimed is:

1. In a direct current electrical circuit, a pair of contacts, means for actuating said contacts to establish and to interrupt the transfer of electrical energy through said contacts, and a contact protector shunting said contacts to protect said contacts from deterioration as a result of said actuation, said protector including a non-linear capacitance, the magnitude of the capacity of said capacitance increasing as the potential applied thereacross increases.

2. Contacts in a direct current electrical circuit, a contact protector for said contacts, said protector comprising a capacitance, the ratio of the capacity of which capacitance to the applied voltage increases as the voltage increases, said protector shunting said contacts.

3. In a direct current electrical circuit, electrical contacts which open and close to establish and interrupt the flow of electric current, a contact protector connected in shunt with said contacts, said protector comprising a condenser, said condenser having a dielectric of barium titanate.

4. A circuit having a contact protector in accordance with claim 3, said protector having a resistance connected in series with said condenser, said condenser and said resistance connected in shunt with said contacts.

5. A circuit having a contact protector in accordance with claim 3, said circuit including a lumped inductance, said protector having a resistance in series with said condenser, said condenser and said resistance in series shunting said inductance.

LAVALETTE STEVENSON CURTIS,
*Executrix of the Estate of Austen M. Curtis, Deceased.*

REFERENCES CITED

The following references are of record in the file of this patent:

UNITED STATES PATENTS

| Number | Name | Date |
|---|---|---|
| 798,336 | Halsey | Aug. 29, 1905 |
| 808,371 | Horry | Dec. 26, 1905 |
| 886,141 | Luschka | Apr. 28, 1908 |
| 1,479,465 | Greenwood | Jan. 1, 1924 |
| 1,553,402 | Slepian | Sept. 15, 1925 |
| 1,751,939 | Meissner | Mar. 25, 1930 |
| 2,071,564 | Nicolson | Feb. 23, 1937 |
| 2,199,909 | Burton et al. | May 7, 1940 |
| 2,306,555 | Mueller | Dec. 29, 1942 |
| 2,369,327 | Wainer | Feb. 13, 1945 |

OTHER REFERENCES

Journal of Research of the National Bureau of Standards Research paper RP 1776, volume 38, March 1947, pages 337–349.